VARIABLE LEVEL NOISE-CLIPPING CIRCUIT

Filed Dec. 15, 1950 2 Sheets-Sheet 1

INVENTOR
Jack Avins
BY
[signature]
ATTORNEY

Jan. 1, 1957 J. AVINS 2,776,338

VARIABLE LEVEL NOISE-CLIPPING CIRCUIT

Filed Dec. 15, 1950 2 Sheets-Sheet 2

INVENTOR
Jack Avins
BY
ATTORNEY

United States Patent Office 2,776,338

Patented Jan. 1, 1957

2,776,338

VARIABLE LEVEL NOISE-CLIPPING CIRCUIT

Jack Avins, Staten Island, N. Y., assignor to Radio Corporation of America, a corporation of Delaware Application December 15, 1950, Serial No. 200,903

The terminal 15 years of the term of the patent to be granted has been disclaimed 5 Claims. (Cl. 178—7.3)

The present invention relates to improvements in signal processing circuits and more particularly, although not necessarily exclusively, to signal processing circuits of the amplitude discriminatory type which permits passage of only those applied signals having amplitudes falling below a predetermined amplitude level without deleteriously affecting the wave form of the signal.

The present invention relates more directly to a novel signal clipping circuit particularly useful in clipping noise disturbances from electrical signals having recurrent portions of the same relative or nominal amplitude.

In one of its aspects the present invention when applied to the television receiving art provides a novel noise limiting circuit which permits all noise in excess of synchronizing signal peaks to be efficiently clipped without destroying the waveform of the synchronizing signal. In particular the novel precision noise clipping action provided by the present invention is rendered substantially immune to rather large variations in the peak to peak amplitude of the applied signal.

The present invention therefore further relates to the improvements in the design and manufacture of television receiving circuits so as to allow a greater dynamic range of television signal amplitudes to be successfully received and reproduced and so as to provide a greater noise immunity in this signal reproduction.

Perhaps nowhere in the electronic art is the demand greater for precision signal processing at low costs than in the manufacture of television receivers. As is well-known by those skilled in the art the present day standard television signal comprises two main portions which are distinguishable from one another by both waveform and amplitude.

These portions are usually called the synchronizing component and the video component. It is the purpose of the synchronizing component to maintain synchronism between the television transmitter image scanning device and the television receiver signal reproducing device so that the picture elments defined by the transmitter will be properly positioned in the television receiver picture raster. The video component defined by lower amplitude variations of course represents the brightness of each element in the picture as scanned at the transmitter and as reproduction at the receiver takes place.

In television receiving circuits some form of synchronizing signal separator circuit (usually called sync separator circuit) is employed to separate the synchronizing signal component (termed sync) from the composite television signal. This sync component is then applied to suitable time constant networks which allow the line and frame frequency sync pulses to be separately channeled to the horizontal and vertical deflection generators of the television receiver. Any noise appearing on the top of the sync pulses will, of course, tend to missynchronize the deflection circuits and therefore cause undesirable disturbances in the reproduced image.

In the prior art considerable noise immunity in the deflection circuits of the television receiver has been obtained through the careful choice of circuit values used in the design of the sync separator circuit itself. For example, the sync separator circuit generally takes the form of a threshold device which permits passage of only signal information above a certain predetermined amplitude. In the case of the standard television signal the synchronizing component represent 100 percent modulation of the television carrier while peak video information seldom exceeds 75 percent modulation of the television carrier. Hence for optimum sync separator action the threshold for the separator must be continually varied in accordance with received signal strength so as to permit only the upper 25 percent of the received signal (representing the sync) to pass to the deflection circuit. Noise peaks therefore tend to make the signal appear stronger than it actually is and therefore cause improper sync separation.

The prior art attempts at solving this problem have been numerous. One of the most common remedial devices is to pass the received demodulated television signal through a clipping stage which clips all signals in excess of a value defined by a control voltage. This control voltage is made a function of the amplitude reached by recurrent peaks of sync signal (representing 100 percent carrier modulation). The development of this control voltage is most commonly accomplished by rectifying the demodulated video signal so that a capacitive load in the rectifier circuit will develop an average voltage representing the peaks of sync. The problem here, however, is that in order to develop the required control voltage in this manner a considerable amount of energy must be taken from the received viedo signal. This means that in cases where the viedo signal is developed across high impedance output terminals the energy taken from the signal at peaks of sync to develop this control voltage will tend to distort or "squash" the waveform of the sync signal. In many instances the destruction of the waveform of the sync is as deleterious to the quality of the reproduced picture as if no attempt at noise immunization had been made.

Thus it is an object of the present invention to provide an improved signal processing circuit of the noise clipping variety for use in signal processing systems of the radio receiving type.

It is another object of the present invention to provide a new and improved noise clipping circuit for use in television receiving circuits which permits precison noise clipping at the peaks of the received sync wtihout adversely influencing the waveform of the sync.

It is another purpose of the present invention to provide an improved noise clipping circuit for use in television signal channels adapted to separate the sync component from received composite television signal and especially in which the composite television signal is developed across a high impedance output terminal across which conventional noise limiting systems would produce distortion of the sync waveform.

In the realization of the above objects and features of advantage with particular attention to television receiving systems the present invention contemplates the use of a rectifier system connected with the incoming composite television signal and a storage capacitor such that the capacitor tends to charge up to peaks of the incoming signal. Means are then provided for supplementing the voltage across the capacitor with low frequency video signal information representing the average brightness of the television scene and in some instances the carrier strength of the received signal. The resulting voltage across the condenser then is used as a reference voltage against which a second diode may work to clip noise peaks in excess of the peaks of sync derived from the same signal source to which the first rectifier unit is connected. If the signal strength varies and the average picture brightness varies the reference voltage on which the noise clipping action is based also varies in such a way as to maintain precision clipping action. Since the voltage on the capacitor is not solely dependent upon rectified peaks of sync, considerably less sync waveform distortion is observed than in some prior art systems.

A better understanding of the operation of the present invention as well as a fuller appreciation of its objects and features of advantage will be observed through a reading of the following description especially when taken in connection with the accompanying drawings in which.

Figure 1:
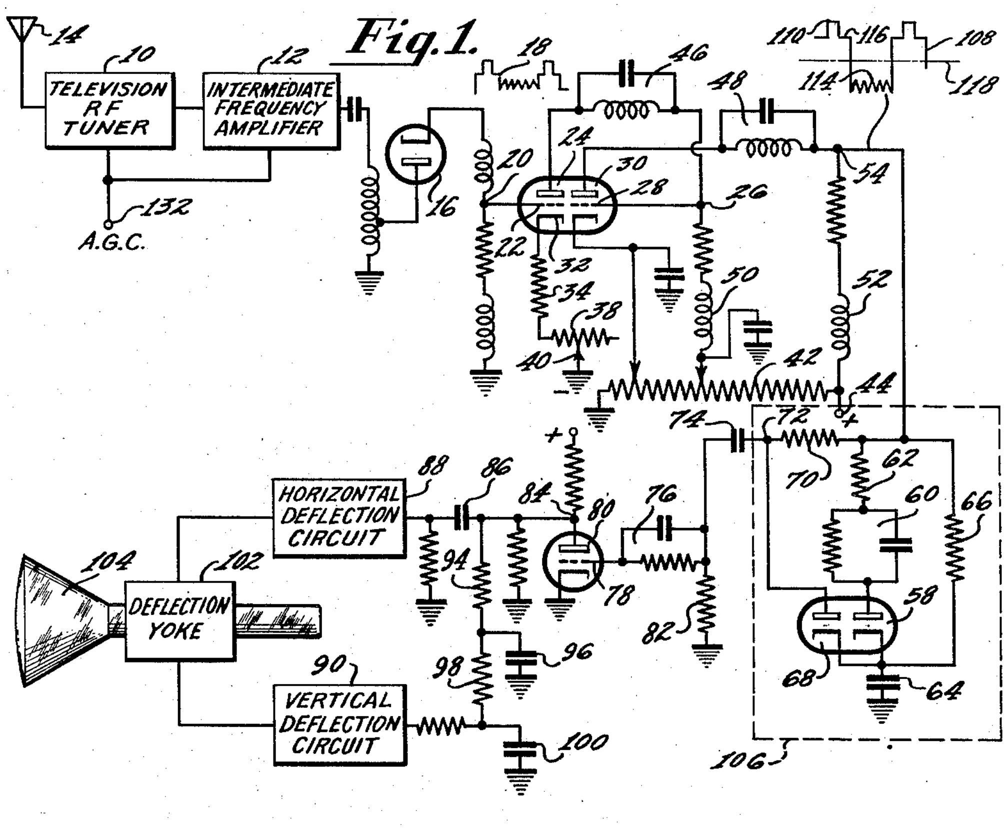
Figure 1 is a combination block diagram and schematic representation of a television receiving system in which the present invention finds embodiment.

Turning now to Figure 1 there is shown at 10 a television R. F. tuner followed by an intermediate frequency amplifier 12. The television R. F. tuner receives signals from the antenna 14 which are amplified and superheterodyned between the tuner and intermediate frequency amplifier and finally demodulated by the diode 16. The demodulated video signal 18 then appears at the terminal 20 of the diode load. The terminal 20 is connected with the grid 22 of the first video amplifier 24 whose output at terminal 26 is D. C. coupled to the grid 28 of the second video amplifier 30. The cathode 32 of the first video amplifier 24 is connected through resistance 34 to the contrast control potentiometer 38 whose variable tap 40 is grounded. Proper operating voltages for the D. C. coupled amplifiers 24 and 30 are, of course, provided by suitable connections to the bleeder 42 connected from power supply terminal 44 to ground. The capacitive inductance circuits 46 and 48, as well as inductances 50 and 52 provide well-known frequency compensation in the video amplifiers.

In accordance with the present invention the output terminal 54 of the second video amplifier 30 is connected to peak rectifier diode 58 through the RC network 60 and resistance 62. The cathode of the diode 58 is in turn connected to a capacitive load comprising capacitor 64. In further acordance with the present invention the resistor 66 is connected in shunt with the diode 58 from the output terminal 54 to the upper terminal of capacitor 64.

Another diode 68 is then provided which is connected in shunt with the first diode 58, and its series elements 60 and 62, through a resistance 70. The resulting signal appearing at the output terminal 72 of the noise limiting arrangement of the present invention is then capacitively coupled by a capacitor 74 and RC network 76 to the grid 78 of the sync separator tube 80. Suitable grid leak resistance 82 is provided for the tube 80. The output of the sync separator tube which appears at the terminal 84 is then coupled via the differentiating capacitor 86 to the input of the horizontal deflection circuit 88 for synchronization thereof by the horizontal sync component of the incoming television signal. The vertical deflection circuit 90 is suitably supplied with vertical sync information through integrating network comprising elements 94, 96, 98 and 100. The outputs of the respective horizontal and vertical deflection circuits are of course applied to the electromagnetic deflection yoke 102 for deflection of the electron beam within the kinescope 104.

With the exception of the novel noise clipping circuit of the present invention shown in the dotted line area 106 the operation of the remaining circuit elements thus far described as well as suitable circuits for the block elements shown are indicated in an article entitled "Television receivers" by Anthony R. Wright appearing in the RCA Review for March 1947, also in an article entitled "Radio set and service review" appearing in the Radio Electronics magazine, November 1950, pages 34 through 36.

The novel operation of the present invention however, is substantially as follows: In Fig. 1 composite television signal 108 appearing at the output terminal 54 of the second video amplifier 30 contains several types of information. Among these the first is synchronizing signal information represented by the sync peaks 110; the second is video signal information determined by the waveform 114 appearing between the sync peaks. Thirdly, black level information is represented by the height of the blanking pulses 116. Fourthly, the signal 108 will have an A. C. axis such as 118 whose distance from the level of blanking 118 represents the average brightness of the scene being transmitted (see television standards waveform 1950, page 1253, November 1950 issue of the IRE Proceedings). This means that the average D. C. potential of the output terminal 54 will vary with respect to ground or a fixed voltage datum in accordance with the average brightness of the scene transmitted. Furthermore, in the particular arrangement shown in Fig. 1, since there is a direct current coupling from the output of the diode 16 to the output terminal 54, the average D. C. potential of the terminal 54 with respect to ground will also vary in accordance with received signal strength. This latter function is of course not necessary for the successful practice of the present invention. As will be seen, it is sufficient that D. C. potential of the output terminal 54 vary only in accordance with average scene brightness.

Thus in accordance with the present invention the resistor 66 connected from the output terminal 54 to the upper terminal of the capacitor 64 will maintain an average D. C. voltage across the capacitor 64 which is a direct function of average picture brightness and received signal intensity. Accordingly, the sync peaks 110 will cause conduction of the diode 58 only in the amount that the sync peaks are above the average D. C. potential of the output terminal 54. Prior art arrangements have depended solely on the rectification of the diode 58 to supply all of the voltage to a storage load such as capacitor 64. It follows therefore that considerably less energy will be required by the present invention to maintain a control or reference voltage across the capacitor 64 which is representative of the peak of the sync component. Noise clipping action is then accomplished by the diode 68 which is connected with the output terminal 54 through resistor 70. Diode 68 is returned to the control or reference voltage appearing across the capacitor 64. Thus as the voltage across capacitor 64 represents the peaks of sync 110, conduction of the diode 68 will prevent noise from appearing at the output terminal 72 of the noise limiting circuit.

In order for this noise limiting action to be accurate the voltage across the capacitor 64 will have to be, in itself, relatively noise immune. A considerable noise immunity is provided by making the time constant of the network 60 relatively fast compared to the horizontal deflection rate. This means that most noise will be dissipated primarily in this time constant circuit. The value of the resistor in the time constant circuit 60 is made as small with respect to the resistor 66 as is consistent with good noise dissipation in the RC network 60. The value of condenser 64 is made a compromise between maximum noise immunity in the circuit and minimum recovery time. The smaller the value of condenser 64 the faster the circuit will operate to recover in the presence of flutter due to airplane interference and the like. For flutter immunity the sync peak level at the cathode of the tube 58 should be capable of responding to increase if input signals at the flutter frequency rate in order not to crush the sync at the input to the sync separator circuit and hence produce objectionable jitter in the picture. The cathode of the diode 58 of course does not need to respond to decrease of input signals since the diode 58 would then be open circuited.

The parallel RC network 76 of the sync separator stage taken in combination with the RC value of the capacitor 74 and resistor 82 provides a well-known double time constant sync separator arrangement. Although the particular form of the sync separator circuit shown in the figure is found to give highly satisfactory results it is understood that the noise limiting action of the present invention is in no way restricted to this particular type of sync separator. The RC network 76 is as for the RC network 60 made relatively short so that any residual which might get through the noise limiting stage will have negligible effect on the sync separator action of tube 80.

It is thus seen from the above that noise limiting circuit of the present invention will provide automatic compensation for changes in received signal level so that noise clipping is always imposed at the peak of sync without producing distortion of the synchronizing signal waveform. Increase in the average scene brightness or signal strength will of course cause greater D. C. value at the output terminal 54 and hence cause capacitor 64 to charge more positively so as to require very little additional energy from the video signal to fully charge the capacitor to the peak of the increased signal amplitude.

Figure 2:
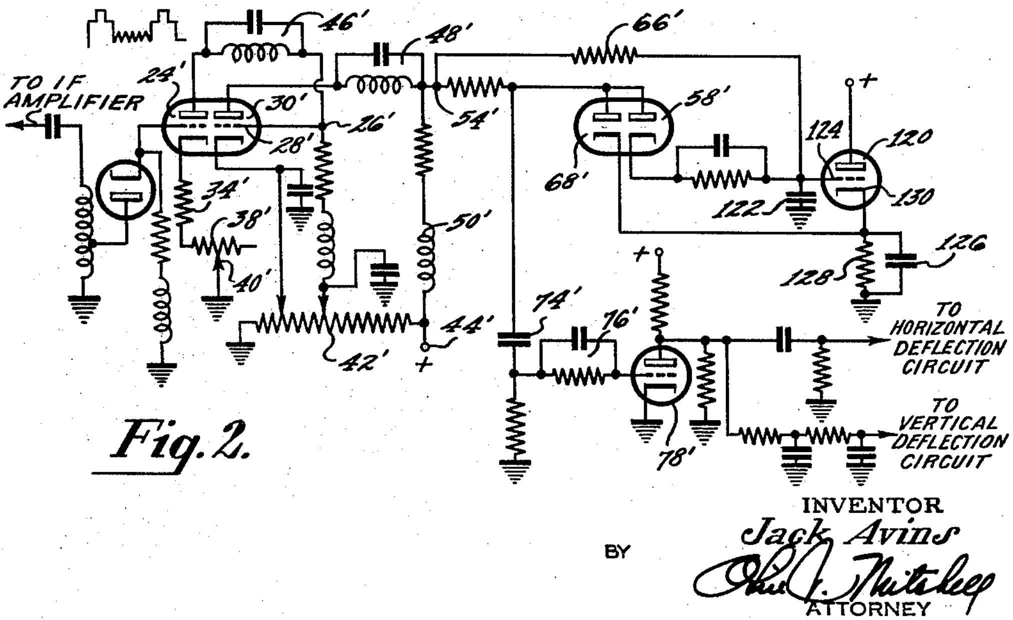
Figure 2 is a schematic representation of a different embodiment of the present invention useful in the general television receiving system shown in Figure 1.

The embodiment of the present invention shown in Figure 2 is an improvement over that shown in Figure 1 at the expense of an additional tube 120 which acts as a cathode follower stage. Here the peak rectifier diode 58′ of Figure 2 (corresponding to the diode of 58 of Figure 1) develops the reference voltage or control voltage across the capacitor 122 which is connected to the grid 124 of the cathode follower 120. The bleeder resistor 66′ of the present invention is of course, as described in the arrangement of Figure 1, connected from the output terminal 54′ to the upper terminal of the storage capacitor 122. Hence the voltage across the capacitor 122 will represent sync peaks in exactly the same manner as would the voltage across capacitor 64 in Figure 1.

However, in Figure 1 the noise clipping diode 68 was directly connected to the capacitor 64 so that any noise clipped by the diode 68 would tend to charge the capacitor 64 up to a higher value. In practice the effect of this can be made negligible by increasing the size of capacitor 64. However, in Figure 2 the noise clipping diode 68′ is connected to the low impedance cathode circuit of the cathode follower 120. Capacitor 126 connected in shunt with the resistor 128 in the cathode of the tube 120 may be made quite large and the resistance 128 quite small. Since the voltage at the cathode 130 of the triode 120 is a direct function of the voltage across capacitor 122′ (due to cathode follower action) the noise clipping diode 68′ will have the same noise clipping effectiveness as did the diode 68 of Figure 1. The advantage of the embodiment of Figure 2 is that due to the low impedance of the cathode circuit 120, noise causing the conduction of diode 68′ will not have an appreciable effect of the voltage across capacitor 126. The remaining portions of Fig. 2 will be seen to substantially be identical to Fig. 1 and have been given like reference numerals followed by a prime designation.

The modification of the invention shown in Figure 3 embodies all of the advantages shown and described with reference to Figure 2 but additionally provides means for developing an automatic gain control potential suitable for application to the R. F. and intermediate frequency of the amplifiers of the television receiver. A typical automatic gain control circuit, by way of example, is shown in an article entitled "Radio set and service review" appearing in the November 1950 issue of the Radio Electronics magazine, pages 34 through 36. By way of illustration, an AGC terminal 132 has been shown in Figure 1. As pointed out in the above Radio Electronics magazine article, the voltage applied to the AGC terminal should be such as to decrease the gain of the R. F. and I. F. amplifiers in response to strong signals while increasing the gain of these amplifiers in response to weak signals. It is common practice to have the AGC terminal directly connected to the grids or control electrodes of the amplifier tubes used in the R. F. and I. F. amplifiers. Thus the AGC voltage under normal conditions is one that is always negative with respect to ground and becomes more negative in response to strong signals and less negative in response to weak signals.

Figure 3:
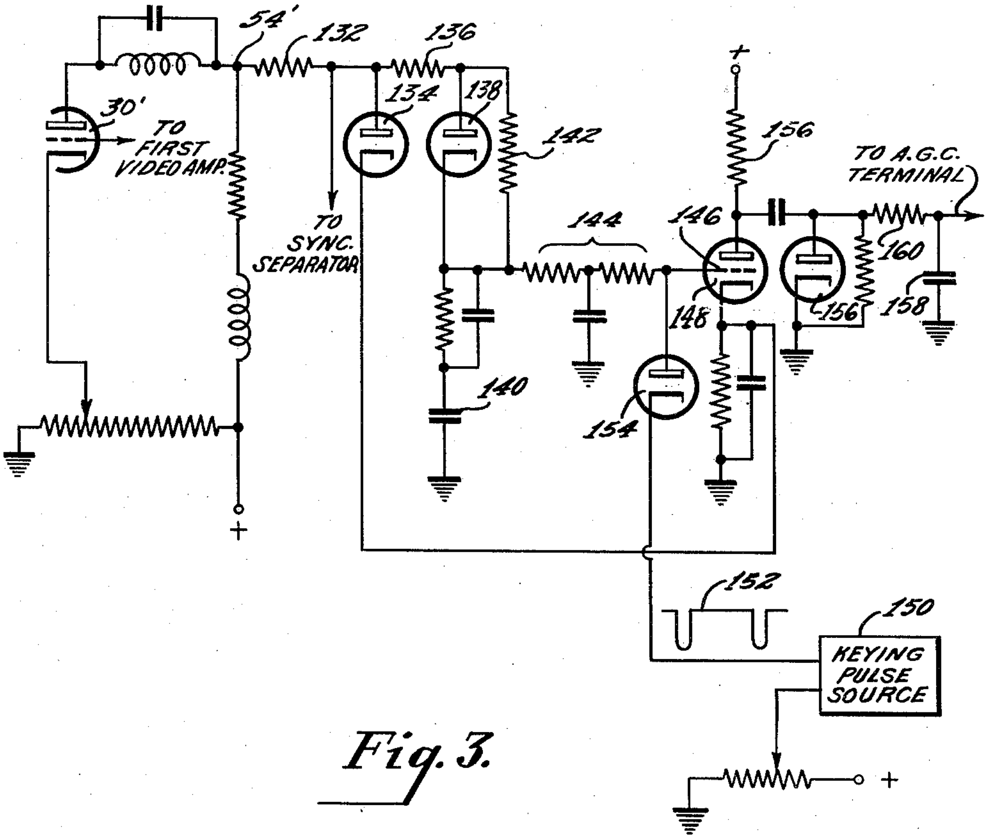
Figure 3 is a schematic representation of still another embodiment of the present invention which additionally provides means for developing an automatic gain control voltage.

The embodiment of the invention in Figure 3, as stated above, is substantially the same as that of Figure 2. The output of the second video amplifier 30′ is coupled via a resistance 132 to the anode of a diode 134. Diode 134 is a counter-part of a diode 68′ of Figure 2. The anode of diode 134 is resistance coupled via resistor 136 to the anode of diode 138. The diode 138 is the counter-part of the diode 58′ of Figure 2. Thus, in accordance with the operation described in Figure 2 there will be developed across the storage capacitor 140 and thence at the cathode of diode 138 a D. C. voltage representing the peaks of incoming television sync. The resistor 142 is the counter-part of resistance 66′ of Figure 2 and in accordance with the present invention reduces the loading effect of the diode 138 on the video amplifier 30′. The D. C. voltage appearing at the cathode of diode 138 is filtered by means of the network 144 and applied to the control electrode 146 of triode 148. Triode 148 is the counter-part of triode 120 in Figure 2. The voltage at the cathode of triode 148 will, by merit of well known cathode follower action, accurately represent the voltage at the grid 146. Thus the noise clipping diode 134 will accomplish precision noise clipping in the same manner described in reference to the arrangement shown in Figure 2.

The arrangement in Figure 3 differs from Figure 2 in the provision of a keying pulse source 150 which applies negative going keying pulses 152 to the grid 146 of triode 148. This is done through the agency of an extra diode 154 which conducts only during the negative going peaks of the waveform 152. By placing a resistor 156 in the anode circuit of the triode 148 positive going pulses will appear at the anode of this triode. These positive going pulses will attain peak signal values which will be defined by the actual potential of grid 146 during the occurrence of the keying pulse. The positive going pulses at the output of the triode 148 are then rectified by the rectifier 156 so as to develop a D. C. voltage across the capacitor 158. The time constant of capacitor 158 taken in connection with resistor 160 filters any residual voltage fluctuations caused by the keying pulse frequency. In the practice of the present invention the keying pulse source may be substituted by any recurrent signal waveform such as a 60 cycle sine wave or deflection energy taken from either the horizontal or vertical deflection circuits of the television receiver. The polarity of diode 156 is such as to provide at the upper terminal of capacitor 158 the proper negative AGC potential required by most automatic gain control systems. An increase in received signal level will cause the grid 146 of triode 148 to swing more positively. This will increase the amplitude of the pulse rectified by the diode 156 and hence cause the negative AGC potential to become more negative and thus decrease the gain of the television receiver. Correspondingly, a reduction in received signal strength will cause a drop in the negative value of the AGC potential to produce the desirable increase in gain of the television receiver amplifiers.

It will be understood in the practice of the above invention that it is not necessary to make output terminal 54 reflect both signal strength and D. C. picture information. It is sufficient that the voltages coupled to the storage capacitor such as 64 in Fig. 1 and 122 in Fig. 2 through the respective bleeder resistors 66 and 66' be representative only of D. C. picture information. This of course, as will be apparent from the above, will provide the novel anti-crushing effect of the present invention during the conduction of the peak rectifying diodes 58 and 58'. In such an event it is not necessary to provide complete D. C. coupling from the demodulator diode (16 in Fig. 1) to the input of the noise immunizing circuit. It is only necessary that some means be provided for clamping or otherwise establishing D. C. picture information at the upper terminal of resistors 66 or 66'.

It is obvious that the utility of the signal processing circuit of the present invention is in no way limited to television signal channels. Any electrical signal having a recurrent portion which nominally represents signal information relative the A. C. axis of that signal, will be such as to benefit from the circuit of the present invention.

Having thus described my invention what I claim is:

1. In a television receiver adapted to receive a television signal having a recurrent horizontal deflection synchronizing component, an amplifier having first and second output terminals, a capacitor having first and second terminals, a galvanic connection between the first terminal of said capacitor and said first amplifier output terminal, a resistance connected between the second output terminal of said amplifier and the second terminal of said capacitor to develop on said capacitor a charge which tends to be a function of the average unilateral potential at the output terminal of said amplifier, a connection between the first terminal of said capacitor and a reference potential means, a first unilateral conduction device, a time constant circuit connected in series with said first unilateral conduction device to form a combination, the value of said time constant circuit being relatively fast compared to the recurrence rate of said horizontal deflection synchronizing component, connections placing said combination between the second output terminal of said amplifier and the second terminal of said capacitor and with such polarity that the direction of current flow is from the amplifier second output terminal to the second terminal of said capacitor, a synchronizing signal separator circuit having first and second input terminals, connecting means placed between the second video amplifier output terminal and the first synchronizing signal separator circuit input terminal, a second unilateral conduction device, connections placing said second unilateral conduction device between the second terminal of said capacitor and the first input terminal of said synchronizing signal separator circuit with such polarity that the direction of current flow is from the first input terminal of said synchronizing signal separator circuit to the second terminal of said capacitor, and a conductive connection from the second terminal of said synchronizing separator circuit to said reference potential means.

2. Apparatus according to claim 1 wherein said last named connection includes a cathode follower stage.

3. In a television receiver adapted to receive a television signal, an amplifier having an output terminal, a capacitor having first and second terminals, a resistance connected between the output terminal of said amplifier and the first terminal of said capacitor to place on said capacitor a charge which is a function of the average unilateral potential at the output terminal of said amplifier, a connection between the second terminal of said capacitor and a point of reference potential, a first unilateral conduction device and a fast time constant circuit connected in series with said first unilateral conduction device to form a combination, connections placing said combination between the output terminal of said amplifier and the first terminal of said capacitor so that said first unilateral conduction device is in shunt with said resistance and with such polarity that the direction of current flow in said unilateral conduction device is from the amplifier output terminal to the first terminal of said capacitor, a synchronizing signal separator circuit having an input terminal, connecting means between the video smplifier output terminal and the synchronizing signal separator circuit input terminal, a second unilateral conduction device, and connections placing said second unilateral conduction device between the first terminal of said capacitor and the input terminal of said synchronizing signal separator circuit with such polarity that the direction of current flow is from the input terminal of said synchronizing signal separator circuit to the first terminal of said capacitor.

4. Apparatus according to claim 3 wherein said last named connection includes a cathode follower stage.

5. In an electrical signaling system, the combination of: a signal amplifier having two output terminals, a circuit ground terminal means; a connection from one amplifier terminal to said ground terminal means; a capacitor having first and second terminals; a first resistance means connected between the first terminal of said capacitor and the said other amplifier output terminal; a connection between the second terminal of said capacitor and said circuit ground terminal means; a first unilateral conduction device having terminals galvanically connected in shunt with at least a portion of said first resistance means; a second unilateral conduction device; a second resistance means connected in series with said second unilateral conduction device to form a combination; galvanic connections placing said combination in shunt with at least a portion of said first resistance means; and signal utilization means connected between said second resistance means and said circuit ground terminal means.

References Cited in the file of this patent

UNITED STATES PATENTS

| | | |
|---|---|---|
| 2,207,587 | Kaar | July 9, 1940 |
| 2,240,600 | Applegarth | May 6, 1941 |
| 2,296,393 | Martinelli | Sept. 22, 1942 |
| 2,305,931 | Martinelli | Dec. 22, 1942 |
| 2,533,803 | Hings | Dec. 12, 1950 |
| 2,535,821 | Thomas | Dec. 26, 1950 |
| 2,620,392 | Lax | Dec. 2, 1952 |
| 2,651,675 | Wissel | Sept. 8, 1953 |

OTHER REFERENCES

"Television and Short Wave World," Murphy, October 1939, pp. 592–593.